United States Patent [19]

Kaplan

[11] Patent Number: 5,389,243
[45] Date of Patent: Feb. 14, 1995

[54] SELF-REGENERATING PRESSURIZED FILTERING SYSTEM FOR LIQUIDS

[76] Inventor: Neil B. Kaplan, 2239 Quail Ridge So., Palm Beach Gardens, Fla. 33418

[21] Appl. No.: 951,917

[22] Filed: Sep. 28, 1992

[51] Int. Cl.6 .............. B01D 29/66; B01D 29/70; B01D 35/143

[52] U.S. Cl. .............. 210/90; 210/106; 210/108; 210/120; 210/193; 210/333.01; 210/411

[58] Field of Search .............. 210/90, 106, 108, 193, 210/332, 333.01, 407, 408, 411, 416.1, 416.2, 791, 483, 484, 120, 169, 777

[56] References Cited

U.S. PATENT DOCUMENTS

| | | | |
|---|---|---|---|
| 3,834,535 | 9/1974 | Portyrata | 210/108 |
| 3,969,248 | 7/1976 | Whitmer | 210/169 |
| 4,578,186 | 3/1986 | Morin | 210/169 |
| 5,057,215 | 10/1991 | Hecking | 210/411 |
| 5,234,605 | 8/1993 | Reipur et al. | 210/108 |

*Primary Examiner*—Jospeh W. Drodge
*Attorney, Agent, or Firm*—Cesari and McKenna

[57] ABSTRACT

A filter system includes a fluid-tight housing with filter elements supported in said housing and dividing the interior of the housing into first and second chambers. A pump pumps a liquid under pressure into said first chamber so that the liquid flows from the first chamber through the filter elements into said second chamber. An energy store is located in the housing which stores energy each time the pump is turned on and pressurizes the first chamber. When the pump is turned off and relieves the pressure in the first chamber, the potential energy stored in the energy store is applied as kinetic energy for moving the filter elements and increasing the pressure in the second chamber to cause liquid backflow through the filter elements which deans and rejuvenates the filter elements.

18 Claims, 3 Drawing Sheets

SELF-REGENERATING PRESSURIZED FILTERING SYSTEM FOR LIQUIDS

This invention relates to a filtering system for liquids. It relates more particularly to a pressurized filter system of the type which incorporates a replaceable particulate filter medium.

BACKGROUND OF THE INVENTION

The filtering systems of the type which we are concerned here are used to filter the liquid circulating in closed loop systems, such as swimming pools, dry cleaning tanks and the like. In such a system, a liquid is pumped through a particulate filter medium such as a filter-aid powder supported in layers on perforate support structures contained in a tank or housing. The liquid is forced under pressure into the housing and through the layers of powder to trap dirt and other particles on the surfaces of those layers. Such pressurized filters which use a powder as the filter medium are able to trap particles as small as 5 to 10 microns, as opposed to conventional sand or paper filters which are only able to remove particulate matter down to 50 to 100 microns.

In most prior systems of this general type, a pump in circuit with the liquid source, e.g., a swimming pool, circulates the liquid through the layers of filter-aid powder and their supports back to the liquid source. To save energy, this pump may be cycled on and off by a suitable timer. Initially, the supports or substrates, which are usually fabric covered perforate structures such as tubes, are loaded with the filter-aid powder by introducing the powder into the liquid stream upstream from the pump. The powder, entrained in the liquid, is trapped by the supports, providing even powder coatings or layers over all of the support surface areas. Once the filter layers are formed, the filter-aid powder remains attached to the supports even when liquid flow through the filter system is stopped or cycled on and off.

During operation of the filter system, dirt particles in the liquid are trapped by the filter medium as the liquid is recirculated, accumulating at the surfaces of the filter layers. Over time, the accumulation of dirt, pollen and other particulate matter forms coatings on the surfaces of the filter layers which greatly increase the back pressure in the system, causing reduced liquid flow and a reduction in overall system efficiency. Usually, the person responsible for the system will become aware at some point that the system is not operating up to par either because of reduced fluid flow, higher system pressure or ineffective filtering action. To remedy this situation, the operator usually replaces the filter powder. This procedure involves reversing the flow of liquid through the filter. In other words, the liquid is caused to flow backwards through the filter support structures underneath the filter-aid powder so that the powder is washed from those structures and settles to the bottom of the filter housing where it is collected and removed from the housing. After the support structures are cleaned as just described, normal liquid flow is resumed and fresh filter powder is introduced into the liquid upstream from the pump to recoat the support structures.

In a typical filter system serving a swimming pool, for example, the system may be cleaned thusly and recharged with fresh filter-aid powder on a monthly basis. It is obvious, however, that the system runs at maximum efficiency only at the very beginning of that time period because with each day's operation, the layers of filter-aid powder become progressively coated with dirt thereby constantly lowering system efficiency.

It has been known for some time that the filter medium becomes blocked primarily by dirt coating the surfaces of the filter layers rather than by penetration of dirt into those layers. It has also been recognized that the effectiveness of the filter medium can be restored by shaking the powder from the filter support structures using a handle attached to those structures with the pump turned off and, then, with the pump turned on again, recoating the support structures with the same powder particles. The dirt which was formally concentrated at the surfaces of the filter layers becomes mixed with the filter powder and no longer reduces the flow of liquid through the filter to any great extent. With the system back pressure reduced and the liquid flow increased almost to that of a freshly charged filter, this procedure allows the operator to save the cost of new filter powder that was formerly required with every cleaning of the filter. Thus, the procedure effectively extends the life of the filter powder many times and increases the efficiency and effectiveness of the filter system because the filter medium can be rejuvenated as often as the operator thinks to do so.

However, those prior art systems with shakable filter elements are disadvantaged in that the filter medium starts to become clogged with dirt from the first day after the filter medium is extended or regenerated. That is, after each regeneration, the system efficiency progressively deteriorates until the operator notices the increased pressure and reduced flow of liquid in the system. In many cases, the operator will delay the regeneration procedure because of neglect or laziness. During this time, filter system may be running with poor efficiency.

Attempts have been made to automatically actuate the shaker handle that shakes the filter elements on a periodic basis using timed electromechanical devices. However, these devices tend to be relatively complicated such that their costs are prohibitive. Moreover, when such timed devices are used, the filter pump's timer and the shaker device's timer have to be carefully synchronized because damage can occur if the shaker is actuated with the filter pump running.

SUMMARY OF THE INVENTION

Accordingly, it is an object of this invention to provide an improved pressurized powder-type filter system for filtering liquids.

Another object of the invention is to provide a system of this type which extends the useful life of the particulate filter medium.

A further object of the invention is to provide such a filter system which can operate at maximum efficiency at all times.

Still another object of the invention is to provide a powder-type filter system whose normal operation automatically regenerates or rejuvenates the system's filter medium.

Still another object of the invention is to provide an improved powder-type filter system with provision for extending the life of the filter medium which is fully automatic, yet which is relatively inexpensive to make and to maintain.

Other objects of the invention will, in part, be obvious and will, in part, appear hereinafter.

The invention accordingly comprises of the features of construction, combination of elements and arrangement of parts which will be exemplified in the construction set forth hereinafter, and the scope of the invention will be indicated in the claims.

Briefly, my system includes a filter unit in circuit with the source of liquid being filtered, e.g., a swimming pool. A pipe from the swimming pool leads to a pump which pumps the liquid to the filter unit. A second pipe returns the filtered liquid from the filter unit back to the swimming pool. The filter unit includes a fluid tight housing or tank which is able to withstand an elevated fluid pressure. The housing is divided into upper and lower chambers by a movable wall in the form of a plate connected at its periphery to the housing side wall by means of a bellows or diaphragm which allows the plate to move up and down within the housing. The plate contains a multiplicity of holes for receiving a corresponding multiplicity of tubular filter elements. Each filter element consists of a tubular support member whose upper end is open and secured in one of the holes in the plate. The lower end of each member is dosed and the member side wall is formed with a relatively large number of holes or perforations. Snugly engaged over each support member is a woven fabric sock or covering which functions as a foundation for a filter-aid powder which is coated onto the filter elements prior to normal operation of the filter system.

When the pump is operative, liquid is pumped from the swimming pool to the housing lower chamber at a relatively high pressure. The water flows through the filter elements to the upper chamber whence it is returned to the swimming pool. Thus, the pressure of the liquid in the lower chamber is much higher than that in the upper chamber with the pressure differential maintaining the movable wall in its uppermost position. As the liquid flows through the filter elements, any dirt or other particulate contaminates therein collect on the surface of the filter elements just as occurs in conventional powder-type filter units. As is done conventionally, the pump may be cycled on and off by a timer to save energy.

In accordance with this invention, the high pressure or lower chamber in my filter unit contains energy storage means which, when the pump is turned on, stores an amount of energy which is proportional to the pressure head produced in that chamber by the pump. Then, when the pump is turned off at the end of each cycle, the reduced pressure in the lower chamber of the housing allows the movable wall supporting the filter elements to drop under gravity thereby reducing the volume of the lower chamber in the housing and increasing volume of the upper chamber therein. Liquid continues to flow through the filter elements as that wall falls to its lowest position allowed by the supporting diaphragm or bellows.

Just as the movable wall reaches its lowest position, it activates the energy storage means so that the potential energy in the storage means is released as kinetic energy for moving the wall supporting the filter elements rapidly vertically upwards so that the wall shakes the filter elements and also functions as a diaphragm or bellows pump which pumps the liquid in the upper chamber of the housing back through the filter elements into the lower chamber. Upon passing through the filter elements, the liquid flows backwards through the filter element's fabric coverings and washes the layers of filter-aid powder from those coverings, the powder and any dirt entrapped by the powder thereupon settling to the bottom of the housing.

When the pump is turned on again at the beginning of the next pumping cycle, the water pumped into the lower chamber of the housing agitates the liquid in that chamber causing the powder and dirt particles that have settled at the bottom of the housing to become entrained in the water. As the water circulates through the filter unit, the powder recoats the fabric coverings of the filter elements, mixing the dirt and other particles within the thicknesses of the powder layers so that the dirt no longer forms a dogging surface coating on the powder layers. This has the effect of regenerating of rejuvenating the filter layers. This reforming of the filter layers on the filter elements occurs during each pumping cycle of the filter system. Therefore, if the system is cycled on and off relatively frequently, e.g., at least once each day, this system will operate at maximum efficiency.

Since the filter system uses existing pump pressure or liquid flow through the system to recharge the energy storage means that creates the shaking of, and backflow through, the filter elements to regenerate the filter elements, the system can operate unattended and without requiring complicated mechanisms external to the filter unit.

As will be described in more detail later, the strength of the simultaneous shaking and backflashing action that regenerates the filter elements of my system can be made to be proportional to the degree of clogging of those elements thereby maximizing the regeneration effect. Also, provision may be made for sounding an alarm when the filter layers became too contaminated to be regenerated.

BRIEF DESCRIPTION OF THE DRAWINGS

For a fuller understanding of the nature and objects of the invention, reference should be had to the following detailed description, taken in connection with the accompanying drawings, in which.

DETAILED DESCRIPTION OF ILLUSTRATIVE EMBODIMENT

Figure 1:
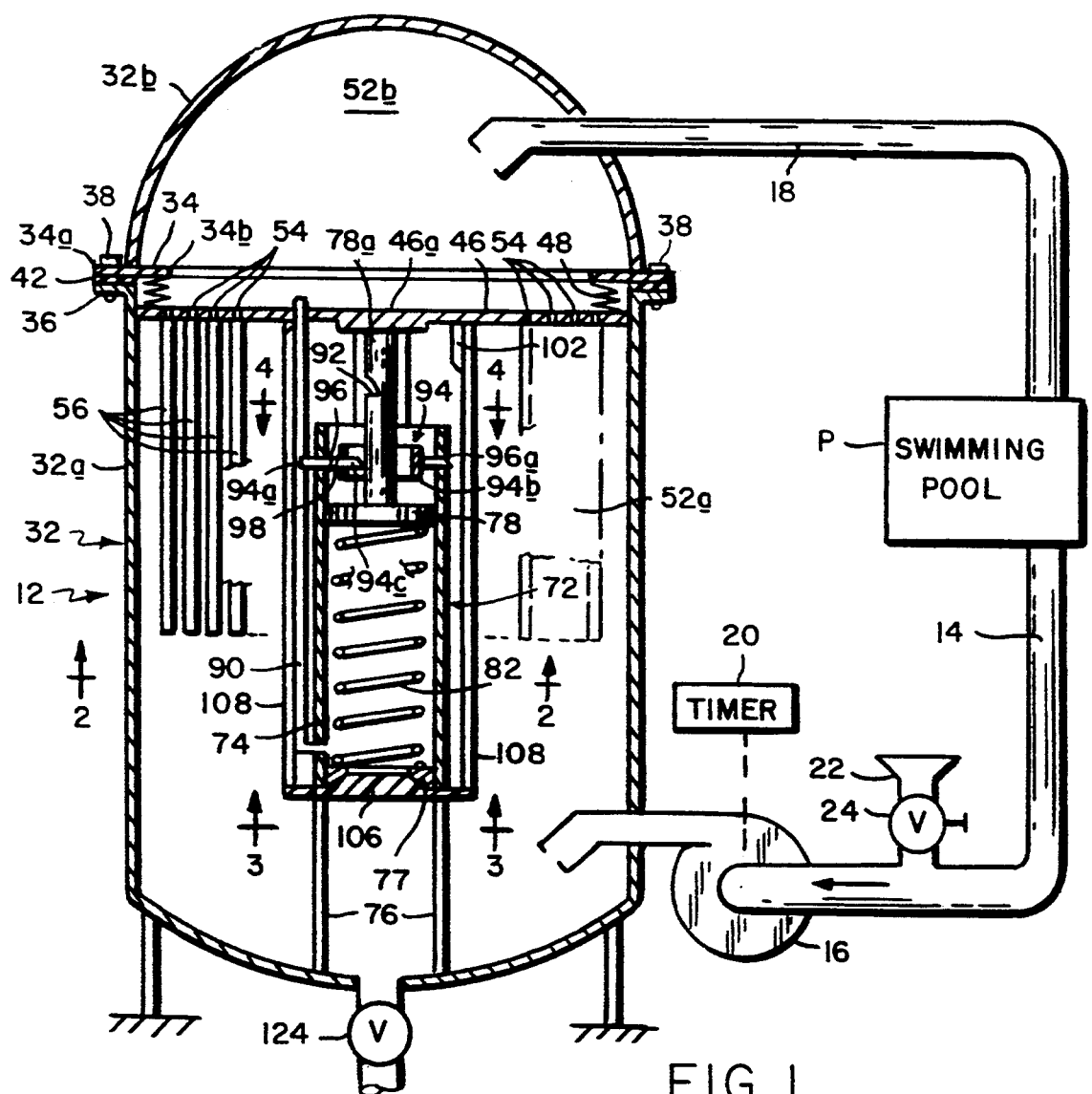
FIG. 1 is a sectional view with parts in elevation showing a filter system incorporating my invention.
Figure 2:
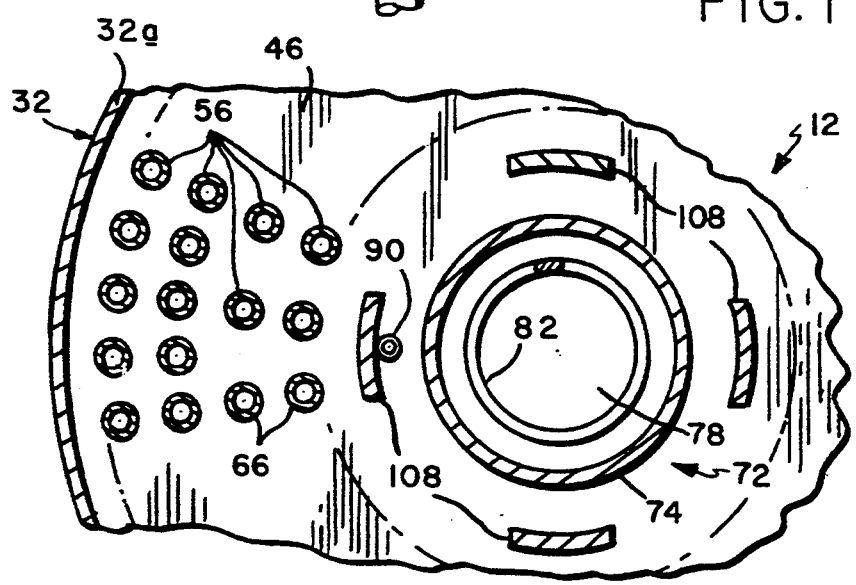
FIG. 2 is a sectional view taken along line 2—2 of FIG. 1.

Referring to FIGS. 1 and 2 of the drawings, my filter system includes a filter unit 12 for filtering the liquid from a suitable source such as a swimming pool P. Water from pool P is conducted by a pipe 14 to a centrifugal pump 16 which pumps the liquid into the bottom of the filter unit. After being filtered by the filter unit, the water is returned to pool P via a pipe 18 extending from the top of the filter unit 12 to the pool. During normal operation of the system, the pump 16 is cycled on and off by a timer 20. Any additives to the fluid loop, such as filter-aid powder, may be introduced into the loop upstream from pump 16 through a standpipe 22 connected to pipe 14 by way of a valve 24.

Filter unit 12 comprises a housing or tank 32 composed of a generally cylindrical lower section 32a and a hemispherical upper section or cover 32b. A circular strap 34 is welded to the edge of cover 32b so that the edge bisects the strap thereby providing a radially outer flange 34a for engagement with a similar flange 36 formed at the upper end of housing section 32a and a radially inner flanges 34b. Normally the two flanges 34a and 36 are secured together all around the housing by appropriate threaded fasteners 38 extending through appropriate openings in flange 34a and turned down into corresponding threaded openings in flange 36. Preferably, a gasket 42 is provided between the two flanges so that a fluid tight seal exists at the boundary between the two housing sections.

Positioned coaxially inside housing 32 is a rigid circular plate or disc 46. Plate 46 is vertically movably supported within the housing by a bellows (or diaphragm) 48 one end of which is connected to the edge margin of the plate and the other end of which is secured to the radially inner cover flange 34b. Thus, the plate 46 and the bellows 48 divide the interior of the housing 32 into a lower chamber 52a and an upper chamber 52b, the volumes of these chambers being variable depending upon the vertical position of the plate 46. Plate 46 is provided with a multiplicity of through-holes 54 which are spaced from and distributed about the center of the plate. Suspended from plate 46 in register with these holes is a corresponding multiplicity of tubular filter elements 56.

Figure 5:
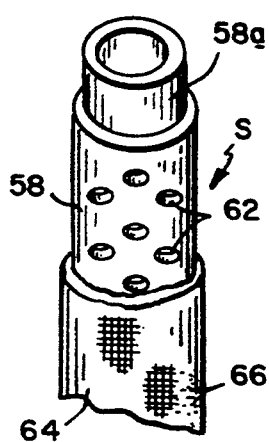
FIG. 5 is a fragmentary isometric view on a much larger scale showing a filter element in the FIG. 1 system.

Refer now to FIG. 5 which illustrates the filter elements 56 in greater detail. As shown there, each element 56 comprises a relatively long relatively rigid tubular support member 58 made of a material able to withstand the effects of the liquid being serviced by the filter system, e.g., polyethylene or aluminum. An upper end segment 58a of member 58 is shaped so that that end can be press fit or screwed into a hole 54 in the plate 46. The lower end of each support member 58 may be closed. However, each member is formed with a multiplicity of relatively large side holes 62 which extend to the interior of the support member. Thus, liquid is able to flow through these holes 62 up the tubes and through the plate holes 54 in which the tubes are connected.

Enveloping each support member 58 is a tightly woven fabric sock or covering 64 (of Dacron polyester or the like) which covers the entire support member except for the end segment 58a thereof. Each sock 64 provides a foundation for a filter-aid powder 66 which normally covers or coats the sock 64. That is, the weave or mesh of each fabric sock 64 is small enough so that while liquid can pass through the sock, the powder 66 particles cannot, with the result that they accumulate at the outer surface of the sock forming a filter layer thereon.

When pump 16 pumps liquid into the housing lower chamber 52a under pressure, the liquid is forced through the layers of filter powder 66 on the filter elements 56 and through the socks 64 and support members 58 of those elements into the housing upper chamber 52b. Any dirt or any other particulate matter entrained in the liquid being pumped cannot pass through the layers of filter powder 66 on the filter elements 56 and thus collect on the outer surfaces of those layers.

Figure 3:
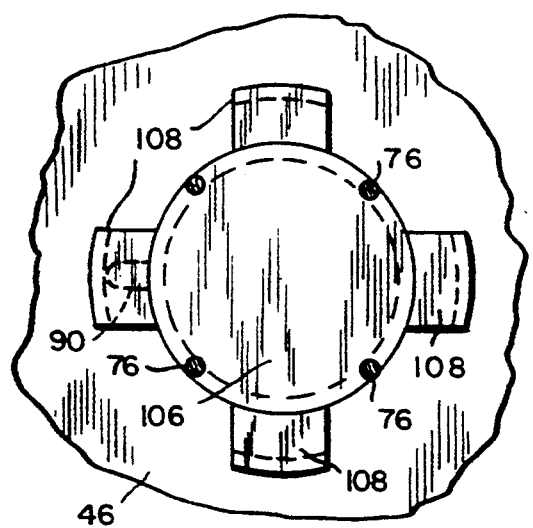
FIG. 3 is a sectional view taken along line 3—3 of FIG. 1.

In accordance with this invention, energy storage means shown generally at 72 in FIG. 1 are positioned in the housing lower chamber 52a. In the illustrated filter unit 12, the energy storage means comprise a spring-loaded actuator comprised of a cylinder 74 supported on end on the centerline of the housing by a set of four rod-like legs 76 as best seen in FIGS. 1 and 3. The upper end of cylinder 74 is open, as is the lower end thereof. However, a circular valve seat 77 is provided at the lower end of the cylinder for reasons that will become apparent. Slidably positioned in cylinder 74 is a piston 78 having an upwardly extending piston rod 78a. The piston 78 is biased upwardly by a coil spring 82 inside cylinder 74 which is captured between the piston and the valve seat 76 at the bottom of cylinder 74. When spring 82 is fully extended, it pushes piston 78 upward so that the piston maintains, plate 46 is in its uppermost position shown in FIG. 1. A depending boss 46a is provided at the center of the plate opposite the piston rod 78a to strengthen the plate where it is engaged by the rod.

Piston 78 is moved downwardly in opposition to the bias of spring 82 when the pressure rises in the lower filter section 52a while bellows 48 remains in its uppermost or collapsed position under that pressure. Preferably, a vent tube 90 is connected between the interior of cylinder 74 and housing upper chamber 52b to vent the cylinder when the piston 78 is moved downward in the cylinder. In accordance with the invention, when the piston 78 is moved downward thereby compressing spring 82 by a selected amount, the piston is latched in that position so as to releasably store energy in the spring.

Figure 4:
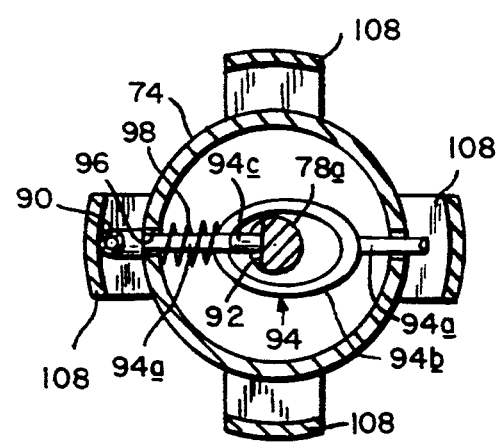
FIG. 4 is a sectional view taken along line 4—4 of FIG. 1.

More particularly, as best seen in FIGS. 1 and 4, one or more notches 92 are provided in the piston rod 78a. Also, a laterally movable latch member 94 is provided near the upper end of cylinder 74. The latch member 94 includes a pair of aligned pins 94a whose adjacent ends are connected by an elliptical ring 94b which surrounds the piston rod 78a. The pins 94a are slidably received in a pair of aligned openings 96 near the upper end of cylinder 74 so that the latch member can slide laterally within those openings. An inner extension 94a of the left hand pin 94a is arranged to project into a rod notch 92 when the latch is slid toward the right and a coil spring 98 captured between the wall of cylinder 74 and the ring 94b biases the latch member toward the right.

During normal operation of filter unit 12 to be described shortly, latch member 94 is moved to the left to release the piston 78 upon engagement of the right hand end of the latch member by a cam 102 mounted to the underside of plate 42 as shown in FIGS. 1 and 2.

Referring to FIGS. 1 to 3, further in accordance with the invention, a movable valve member 106 is provided in the housing chamber 52a for seating against the valve seat 76 to close the lower end of cylinder 74. In the illustrated filter unit 12, the valve member 106 is suspended from plate 46 by a set of four straps 108. When bellows 48 is fully collapsed and plate 46 is in its uppermost position shown in FIG. 1, the valve member 106 seats against valve seat 76 and closes the bottom of cylinder 74. On the other hand, when the bellows 48 is extended thereby moving plate 46 downwards (see FIG. 6), the valve member 106 is moved away from the valve seat thereby opening the bottom of cylinder 74. It should be noted that it is this downward motion of the plate 46 which moves the cam 102 opposite the latch member 94 thereby disengaging the latch member from the piston rod 78a as described above.

We will now describe the operation of the filter system. When the pump 16 is not operating and the system is at rest as shown in FIG. 1, the actuator 72 has minimal stored energy. In this condition, spring 82 is extended and pushes piston 78 upwards against the underside of plate 46 so that bellows 48 is maintained in its collapsed condition against the rigid flange 34b which prevents the bellows from being damaged by the force on the bellows. With plate 46 in this uppermost position, the valve member 106 is supported against the valve seat 76 so that the bottom of cylinder 74 is closed.

Figure 6:
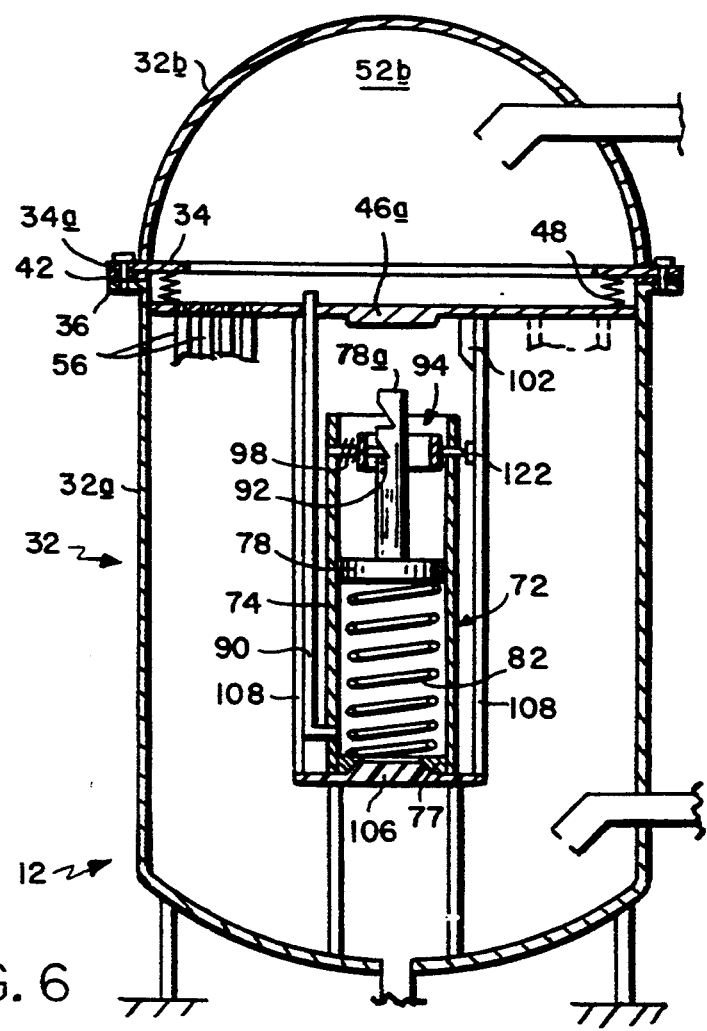
FIGS. 6 and 7 are views similar to FIG. 1 showing the operation of my system.

Now, when pump 16 is turned on by timer 20 at the beginning of each pumping cycle, the pump pumps liquid from pool P into the lower chamber 52a of housing 32 under a selected pressure, e.g., 20 psi. This hydrostatic pressure, or more particularly the pressure differential in chambers 52a and 52b, maintains the plate 46 in its uppermost position so that the bellows 48 remains collapsed and the valve member 106 remains seated as shown in FIG. 6. The pressure of the liquid on the underside of valve member 106 helps to maintain a good fluid tight seal at the bottom of the cylinder 74.

The pressure of the fluid in the housing chamber 52a also exerts a downward force on the piston 78 urging that piston downward in cylinder 74 against the bias of spring 82 as shown in FIG. 6. The vent tube 90 leading from cylinder 74 to the housing upper chamber 52b allows liquid to escape from the cylinder below the piston as the piston descends within the cylinder to compress spring 82. As soon as the piston 78 is moved downward to position a notch 92 in the piston rod 78a opposite the latch 94, the latch engages in the notch as shown in FIG. 6 to releasably lock the piston in that position so that a substantial amount of potential energy is stored in the compressed spring 82. Once the piston rod 78 is latched as aforesaid, it will remain latched as long as the pump 16 continues pumping liquid into the filter unit 12.

If the filter unit 12 is being used for the first time, the valve 24 may be opened and filter-aid powder P may be introduced into the standpipe 22. The powder will become entrained in the liquid entering the housing chamber 52a and will become coated on the outsides of the fabric socks 64 (FIG. 5) on the filter elements 56 thereby providing a multiplicity of powder filter layers on those elements as described above.

As the pump 16 continues pumping, the water pumped into the filter unit 12 will flow through the filter elements 56 into the housing upper chamber 52b and will be returned to the pool P via pipe 18. Any dirt or particulate matter in the water becomes trapped on the exterior surfaces of the filter elements 56.

Figure 7:
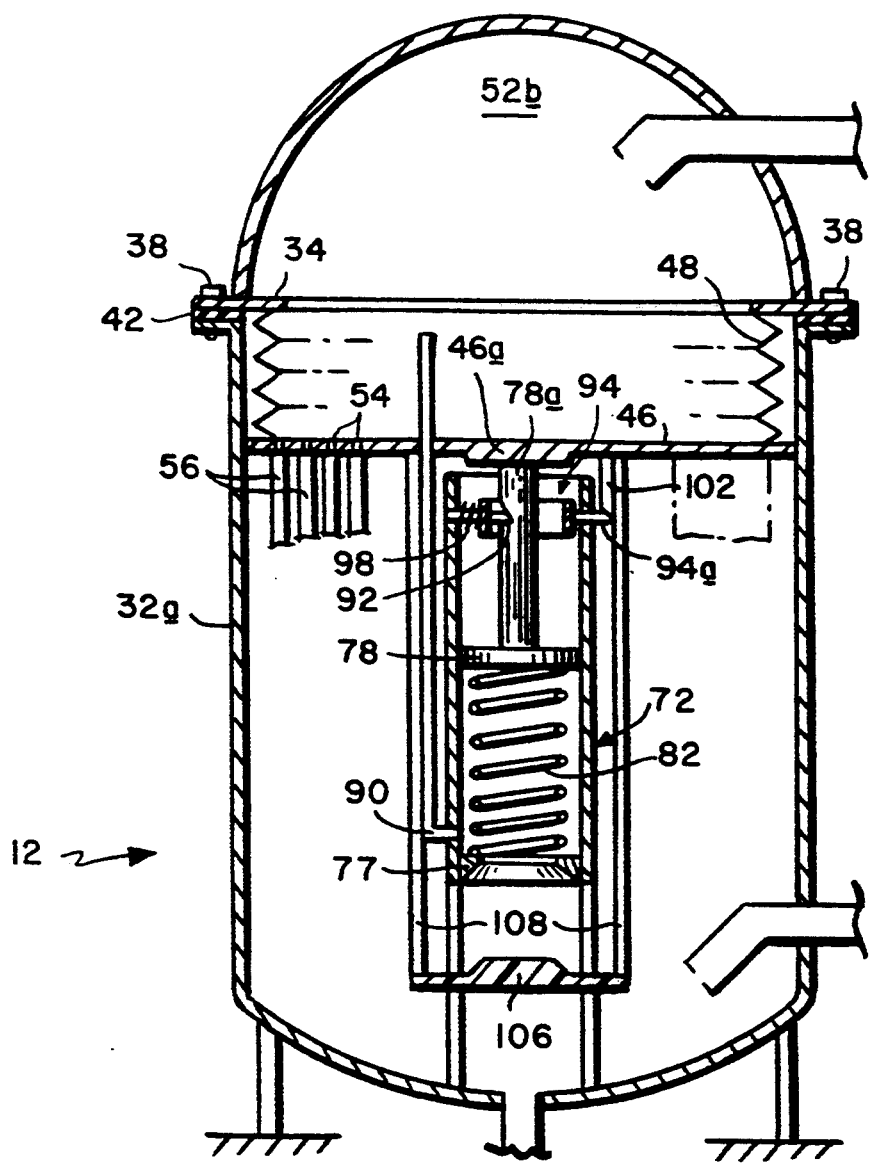

Refer now to FIG. 7, when the timer 20 turns off pump 16 at the end of each pumping cycle, the pressure in the housing lower chamber 52a is relieved so that the pressures in the housing chambers 52a and 52b equalize. Resultantly, the plate 46 is urged downward within housing 32 by the weight of the plate and the filter elements 56 including the powder 66 coatings on the outsides of those filter elements. Also, if desired, the bellows 48 may be provided with a positive spring rate to provide an additional downward force on plate 46. As the plate 46 descends, the valve member 106 supported by the plate also moves down within the housing thereby opening the bottom of the actuator cylinder 74 so that the fluid pressures inside and outside the cylinder remain the same.

When plate 46 approaches its lowest position shown in FIG. 7, cam 102 engages and shifts latch 94 to the left, thereby disengaging the latch from the notch 92 on the piston rod 78a. Immediately, the piston is driven rapidly upward by the compressed spring 82. Resultantly, the piston pushes the plate 46 vertically upward thereby collapsing the bellows 48. Since the bottom of cylinder 72 is open at this time, there is no negative pressure developed within the cylinder to slow the upward motion of the piston. The rapid upward motion of the plate shakes the filter elements 56 loosening and dislodging powder 66 thereon. Also, the plate and bellows now function as a bellows pump which rapidly pressurizes the liquid in the housing chamber 52b so that the liquid is forced down through the holes 54 in plate 46 and backwards through the filter elements 56 into housing chamber 52a. This backflow of liquid through the filter elements, lifts the powder 66 from the socks 64 thereby flushing all of the filter aid powder from the filter elements.

Since a volume of liquid corresponding to the volume of the extended bellows 48 is forced backward through the filter elements each time the filter system is turned off, substantially all of the powder 66 is removed from those elements during each pumping cycle of the system. This powder and any dirt trapped by the filters during the previous pumping cycles settles to the bottom of the housing section 32a. At this point, the filter unit 12 has returned to its condition shown in FIG. 1, i.e., bellows 48 is collapsed, actuator 72 is extended and valve member 106 is seated.

When the timer 20 turns on the pump 16 again at the beginning of the next pumping cycle, the high pressure liquid entering the housing chamber 52a causes a swirling action of the liquid in that chamber. This distributes the powder 66 and dirt particles at the bottom of the chamber 52a throughout the liquid volume so that the powder and dirt particles recoat the foundation socks 64 of the filter elements 56. However, since the dirt particles are now mixed within the thicknesses of the powder layers rather than coating the surfaces thereof, the dirt particles no longer prevent or inhibit the water from flowing through the filter elements. Thus, the filter unit 12 again effectively filters the water flowing through the filter unit.

It will be appreciated from the foregoing that the extent to which the spring 82 is compressed by the piston 78, i.e., the amount of potential energy stored in the spring during each pumping cycle, depends upon the water pressure in the housing lower chamber 52a. That pressure head depends, in turn, upon the amount of liquid flow through the filter elements 56. As those filter elements become clogged with dirt, the greater the back pressure produced at the filter elements and the higher the pressure head in housing chamber 52a and the greater the pressure differential in the two chambers 52a and 52b.

In a preferred embodiment of the invention, advantage is taken of that variable pressure head to store a variable amount of energy in the energy storage means or actuator 72. More particularly, piston rod 78a may be provided with a plurality of notches 92 spaced along the length of the rod as shown in FIG. 6. Since the amount of downward motion of the piston is determined by the pressure in chamber 52a, it will be appreciated that a certain pressure head may shift the piston downward such that the latch 94 latches in the lower notch 92 on the piston rod 78a thus storing a selected potential energy in spring 82. On the other hand, if a higher pressure head exists in chamber 52a, the piston 78 will be pushed down further in its cylinder 74 so that the latch 94 latches in the next higher notch 92 in the piston rod 78a thereby storing a greater amount of energy in the spring 82, and so on. Resultantly, when the latch 94 releases the piston 78 at the end of each pumping cycle, the plate 46 will be driven upwardly by a force which is more or less proportional to the degree of clogging of the filter elements 56. If the filter elements are dogged only moderately, the pumping action of the plate and bellows 48 will produce a moderate liquid backflow through the filter elements sufficient to lift the filter powder from those elements. On the other hand, if the filter elements are severely clogged resulting in a greater back pressure at those elements, the pumping impulse of the plate 46 and bellows 48 will be that much stronger, resulting in a more forceful backflow of liquid through the filter elements.

After many pumping cycles of the filter system, so much dirt may become mixed with the filter-aid powder 66 on the filter elements 56 that the powder layers are no longer regenerated effectively by the backflushing and filter layer reforming operations described above. This will be manifested by a substantial back pressure caused by the clogged filter elements, resulting in a greatly reduced flow through filter unit 12 and a substantial pressure head in the housing chamber 52a when pump 16 is pumping. This pressure head will result in the piston 78 being driven downwards in cylinder 74 to a maximum extent such that the latch 94 will engage in the uppermost notch 92 on the piston rod 78a. Provision may be made for signaling the operator that this extreme position of the piston has been reached indicating that the filter powder is too contaminated for regeneration. As shown in FIG. 6, this signal may be provided by making the uppermost notch 92 on the piston rod 78a deeper than the others so that when the latch 94 engages in that uppermost notch, it will travel to the right to a greater extent than when engaged in the other notches. To sense this condition, a microswitch 122 may mounted to the strap 108 opposite the right hand end of the latch, such that the switch is actuated by the latch only when the latch is engaged in the deeper uppermost notch 92.

Switch 122 may be used to control the actuation of a standard audio and/or visual indicating device (not shown). In response to that alarm, the operator may turn off the pump 16 and drain off the contaminated filter aid powder 66 from the bottom of housing 32 through a valved drain line 124 shown in FIG. 1 and recharge the filter unit 12 with fresh filter-aid powder through the standpipe 22 as described at the outset.

It will be appreciated from the foregoing that my improved filter system extends the useful life of common filter-aid powders while maintaining the operation of the system at maximum efficiency. My system is able to regenerate the layers of filter powder automatically using the energy produced by the system's own circulating pump during normal operation of the system so that intervention by the operator and mechanisms external to the filter unit are not required. Therefore, my system should find wide application in filter systems which use filter-aid powders to filter water and other liquids.

It will thus be seen that the objects set forth above, among those made apparent from the precedent description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention described herein.

I claim:

1. A filter system comprising
  a fluid tight housing;
  one or more filter elements dividing said housing interior into a first chamber and a second chamber, each filter element including a perforate support structure and a filter-aid powder coating said support structure;
  means for introducing a liquid under pressure into said first chamber so that said liquid flows from said first chamber through each filter element into the second chamber;
  means for conducting liquid from the second chamber;
  pumping means in said housing for increasing the fluid pressure in said second chamber;
  energy storage means in said housing and responsive to a pressure differential between said first and second chambers for storing energy, and
  means responsive to a pressure change in one of said chambers for applying the energy stored by said energy storage means to drive said pumping means so as to produce liquid backflow through each filter element.

2. The system defined in claim 1 wherein each filter element also includes a porous powder foundation between the powder and the support structure.

3. The system defined in claim 1 and further including
  a wall supporting said one or more filter elements, and
  means for movably mounting said wall in the housing, said wall and mounting means constituting said pumping means.

4. The system defined in claim 3 wherein said wall and mounting means include a bellows.

5. The system defined in claim 3 wherein the mounting means and wall comprise a flexible diaphragm.

6. A filter system comprising
  a fluid-tight housing;
  one or more filter elements dividing said housing interior into a first chamber and a second chamber;
  means for introducing a liquid under pressure into said first chamber so that said liquid flows from said first chamber through each filter element to the second chamber;
  means for conducting liquid from the second chamber;
  pumping means in said housing for increasing the fluid pressure in said second chamber;
  energy storage means in said housing and responsive to a pressure differential between said first and second chambers for storing energy, said energy storage means comprising a resilient variable volume container located in the first chamber collapsible in response to a pressure increase in the first chamber, and means responsive to a pressure change in one of said chambers for applying the energy stored by said energy storage means to drive said pumping means so as to produce liquid backflow through each filter element.

7. The system defined in claim 6 wherein the energy storage means comprise a linear actuator including a cylinder and a piston movable in the cylinder between an extended position and a retracted position;

a spring for biasing the piston to said extended position, and means for releasably retaining the piston in said retracted position.

8. The system defined in claim 7 wherein a wall is movably mounted in the housing and supports said at least one filter element, and the applying means include a piston rod extending between said piston and said wall so that the movable wall constitutes said pumping means.

9. The system defined in claim 7 wherein the retracted position of said piston in said cylinder is directly related to the pressure differential between said first and second chambers caused by back pressure developed at said one or more filter elements.

10. The system defined in claim 9 and further including signaling means, and means responsive to a selected position of said piston in said cylinder for actuating said signaling means.

11. A filter system comprising a fluid-tight housing;

one or more filter elements in said housing and dividing the housing interior into a first chamber and a second chamber, each filter element including a perforate support and a layer of filter-aid powder covering said support;

means for introducing a liquid under pressure into said first chamber so that the liquid flows from said first chamber through each filter element into said second chamber;

means for conducting liquid from the second chamber;

energy storage means responsive to liquid pressure and liquid flow through said filter system for storing potential energy, and means for converting the potential energy stored by the energy storage means to kinetic energy for rapidly moving each filter element in response to a reduction of liquid flow through said filter system, said movement of each filter element being sufficient to loosen or shake said powder from the associated support.

12. A filter system comprising a fluid-tight housing;

one or more filter elements in said housing and dividing the housing interior into a first chamber and a second chamber;

means for introducing a liquid under pressure into said first chamber so that the liquid flows from said first chamber through each filter element into said second chamber;

means for conducting liquid from the second chamber;

energy storage means responsive to liquid pressure and liquid flow through said filter system for storing potential energy;

means for converting the potential energy stored by the energy storage means to kinetic energy for rapidly moving each filter element in response to a reduction of liquid flow through said filter system;

pumping means in said housing for increasing the fluid pressure in said second chamber, and means for applying the energy stored by said energy storage means to drive said pumping means so as to produce liquid backflow through each filter element as each filter element is moved by said converting means.

13. The system defined in claim 12 and further including a wall supporting said one or more filter elements;

means for movably mounting the wall in the housing, said wall and said mounting means constituting said pumping means.

14. The system defined in claim 13 wherein said applying means include actuator means for engaging and moving said wall.

15. A filter system comprising a fluid-tight housing;

one or more filter elements in said housing and dividing the housing interior into a first chamber and a second chamber, said one or more filter elements including a supporting wall and means for movably mounting said wall to the housing;

means for introducing a liquid under pressure into said chamber so that the liquid flows from said first chamber through each filter element into said second chamber;

means for conducting liquid from the second chamber;

energy storage means responsive to liquid pressure and liquid flow through said filter system for storing potential energy, and means for converting the potential energy stored by the energy storage means to kinetic energy for rapidly moving each filter element in response to a reduction of liquid flow through said filter system, said converting means including a cylinder and a piston movable in the cylinder between a retracted position and an extended position wherein said piston engages and moves said wall, said energy storage means including a spring for biasing the piston to said extended position, and means for releasably retaining the piston in said retracted position.

16. The system defined in claim 15 wherein the retaining means include a latch for latching the piston when the piston is moved to said retracted position, and further including means movable with said wall for unlatching the latch from the piston when said wall is moved to a selected position in said housing.

17. The system defined in claim 16 and further including means for venting said cylinder when said piston is moved toward said extended position.

18. The system defined in claim 17 wherein the means for venting include a valve seat at a lower end of said cylinder;

a valve member for seating on the valve seat, and means linking said wall and said valve member so that said valve member moves with said wall.

* * * * *